US010689966B2

(12) United States Patent
Mazzone

(10) Patent No.: US 10,689,966 B2
(45) Date of Patent: Jun. 23, 2020

(54) AUXILIARY DRILL HANDLE

(71) Applicant: Libero Mazzone, Grateloup (FR)

(72) Inventor: Libero Mazzone, Grateloup (FR)

(*) Notice: Subject to any disclaimer, the term of this patent is extended or adjusted under 35 U.S.C. 154(b) by 229 days.

(21) Appl. No.: 15/576,916

(22) PCT Filed: May 23, 2016

(86) PCT No.: PCT/FR2016/051215
§ 371 (c)(1),
(2) Date: Nov. 27, 2017

(87) PCT Pub. No.: WO2016/189240
PCT Pub. Date: Dec. 1, 2016

(65) Prior Publication Data
US 2018/0142542 A1 May 24, 2018

(30) Foreign Application Priority Data
May 27, 2015 (FR) .................................... 15 54756

(51) Int. Cl.
B23B 49/00 (2006.01)
B23B 35/00 (2006.01)
E21B 44/02 (2006.01)
B25F 5/02 (2006.01)
E21B 7/02 (2006.01)
(Continued)

(52) U.S. Cl.
CPC .............. *E21B 44/02* (2013.01); *B23B 35/00* (2013.01); *B23B 49/00* (2013.01); *B25F 5/026* (2013.01); *E21B 7/022* (2013.01); *E21B 44/10* (2013.01); *B23B 47/32* (2013.01); *B23B 49/006* (2013.01); *B23B 2260/1285* (2013.01); *B25D 2250/221* (2013.01)

(58) Field of Classification Search
CPC ................................ B23B 49/00; B23B 35/00
See application file for complete search history.

(56) References Cited

U.S. PATENT DOCUMENTS 2,407,845 A * 9/1946 Nemeyer ............. B25H 1/0092
116/200
2,483,060 A * 9/1949 Niedelman .......... B25H 1/0078
408/112
(Continued)

FOREIGN PATENT DOCUMENTS

DE 10 2009 007 977 A1 7/2009
DE 10 2008 054 455 A1 6/2010
(Continued)

*Primary Examiner* — Christopher W Fulton
(74) *Attorney, Agent, or Firm* — Renner Kenner Greive Bobak Taylor and Weber

(57) ABSTRACT

Auxiliary handle installed on the casing (11) of a drill (1) having a drilling axis (Xo), incorporating an electronic acceleration meter (231), with axes (XoYoZo) defining a reference point; one (Xo) of the axes being the drilling axis; the other axis (Yo) being that of the handle (2); and a reference surface (SR, SR1-SR3, 3, 4) associated with the reference point of the acceleration meter (231) to register the relative position between the surface to be drilled (S) and the drill (1), and calculate the set position of the drilling axis (Xo), and a display (25) to show the set position of the handle (2) calculated from the set position of the drilling axis (Xo) to execute the drilling.

6 Claims, 4 Drawing Sheets

(51) Int. Cl.
*E21B 44/10* (2006.01)
*B23B 47/32* (2006.01)

(56) References Cited

U.S. PATENT DOCUMENTS

| | | | | |
|---|---|---|---|---|
| 2,670,638 A * | 3/1954 | Roy, Sr. | ............... | B25H 1/0078 |
| | | | | 408/112 |
| 3,763,570 A * | 10/1973 | Andersen | ............... | B23Q 17/22 |
| | | | | 33/370 |
| 4,132,496 A * | 1/1979 | Casto | ................... | B25H 1/0078 |
| | | | | 408/112 |
| 4,227,839 A * | 10/1980 | Conway | ............... | B25H 1/0092 |
| | | | | 408/112 |
| 4,329,095 A * | 5/1982 | Schmuck | ........... | B23B 49/006 |
| | | | | 408/112 |
| 4,406,069 A * | 9/1983 | Clement | ................ | G01B 5/245 |
| | | | | 33/520 |
| 4,457,078 A * | 7/1984 | Suchy | .................. | B25H 1/0085 |
| | | | | 33/334 |
| 6,499,219 B1 * | 12/2002 | Wightman | .............. | B25F 5/024 |
| | | | | 33/334 |
| 6,587,184 B2 * | 7/2003 | Wursch | .................. | B23B 49/008 |
| | | | | 356/139.03 |
| 7,182,148 B1 * | 2/2007 | Szieff | ...................... | B25B 21/00 |
| | | | | 173/171 |
| 2005/0161241 A1 | 7/2005 | Frauhammer et al. | | |
| 2009/0260239 A1 | 10/2009 | Cerwin | | |
| 2013/0174397 A1 * | 7/2013 | Katzenberger | ........... | B21J 15/10 |
| | | | | 29/426.2 |

FOREIGN PATENT DOCUMENTS

| | | | | |
|---|---|---|---|---|
| DE | 202019101400 U1 * | 4/2019 | ............ | B23B 45/00 |
| EP | 1 271 094 A1 | 1/2003 | | |
| FR | 2847503 A1 * | 5/2004 | ............ | B23B 49/00 |
| GB | 2552826 A * | 2/2018 | ............ | B23B 49/00 |

* cited by examiner

AUXILIARY DRILL HANDLE

DOMAIN OF THE INVENTION

The invention herein pertains to an auxiliary handle designed to be installed on the casing of a drill having a drilling axis.

STATE OF THE ART

Drilling jigs for portable drills or perforators are known, being composed of a globally-cylindrical part, of a certain thickness (around 3 to 5 centimeters) with a bearing surface and channels of various diameters—for example, 4, 5, 6, 8 or 10 millimeters—perpendicular to the bearing surface, to act as guide for the drilling bit of a drill or perforator. This guide bears on the surface to be drilled while the drill drills into the medium to be drilled.

Although this guide is advantageous for enabling drilling perpendicular to the surface, it nonetheless has the disadvantage of concealing the surrounds around the hole being drilled, at the moment of commencement of the drilling, which does not allow precise drilling. In addition, the channels worked in this jig are perpendicular to the bearing surface of the jig.

This part does not permit one to accurately achieve a drilling of a given orientation at a precise location. Furthermore, this is a part that is very quickly worn by the friction of the drilling bit within the channel, such that the guidance very quickly loses precision. Additionally, to achieve a certain guidance, the jig—namely the drilling channels of the jig—have to be of a certain length such that the drilling bit, which bears against the jig via the front of the chuck, can only drill with the part of the drilling bit that protrudes from the said jig. This considerably reduces the drilling capability, which makes it necessary to use drilling bits of greater length than that needed for the drilling of the actual hole. Conversely, if one removes the jig after the commencement of a drilling, the drilling bit will no longer be guided, and the drilling will be imprecise.

This disadvantage is worsened in that the drilling bit is of small diameter, of which the length depends very globally on the diameter, for reasons of robustness of the drilling bit.

PURPOSE OF THE INVENTION

The purpose of the invention herein is to develop an auxiliary drill handle allowing one to drill along a given line of orientation of the drilling within a medium, and notably in the direction of drilling perpendicular to the medium's surface, with easy-to-use means compatible with drilling machine tools in very widespread use—such as drills or perforators—providing a good visibility of the drilling location, notably if it has to be lit up by the illumination of the auxiliary handle or a light source incorporated within the drill's casing.

EXPLANATION AND ADVANTAGES OF THE INVENTION

The invention concerns an auxiliary drill handle of the kind specified above, characterized in that it incorporates an electronic acceleration meter, with axes defining a reference point, of which one of the axes is the drilling axis and the other axis is that of the handle, and a reference surface associated with the reference point of the acceleration meter to mark the relative position between the surface to be drilled and the drill, and to calculate the set position of the drilling axis, and a display to show the set position of the handle calculated from the set position of the drilling axis to execute the drilling.

The auxiliary handle according to the invention leaves the location of the drilling visible, which enables the operator to very accurately monitor the progress of the drilling, and the progress of the drilling tool within the surface to be drilled—the material of a wall or partition, or whatever other medium to be drilled.

The auxiliary handle allows reading of the orientation of the surface to be drilled. As the handle has a fixed position in relation to the body of the drill, or a position that is adjustable in relation to it, in both cases, the drilling axis is in a position established in relation to the auxiliary handle such that, starting from the raised position (registered position) of the surface to be drilled in relation to the acceleration meter's reference point, the display guides the user for orienting the drilling axis—in principle, through just the movement in orientation of the handle. In practice, the orientation movement is aided by the other hand, which holds the other handle, but these two movements are linked, and the orientation movement is ultimately imposed by the display on the handle.

According to another advantageous characteristic, the handle incorporates a collar for fitting onto the cylindrical neck of the drill. This assembly facilitates the positioning, the removal and the orientation of the auxiliary handle.

According to another advantageous characteristic, the reference point formed by the axes of the acceleration meter is an orthogonal reference point. According to another advantageous characteristic, the reference surface is formed by the elementary surfaces of the shell of the auxiliary handle. To mark the orientation of the surface to be drilled, one simply applies these elementary surfaces of the shell, after having generally dismounted the drill handle, to register the orientation of the surface to be drilled, and to reset the handle in position.

According to another advantageous characteristic, the reference surface is formed by a flat disc endowed with a shaft to be installed in the drill's chuck, and thus define the orientation of the handle in relation to the surface to be drilled, by pressing this reference surface against the surface to be drilled. One saves the marking of the surface in the handle's acceleration meter. This solution has the advantage of not requiring the dismounting of the handle, and of being particularly simple to apply because the flat disc and its shaft are installed within the chuck, and the surface of the flat disc is therefore perpendicular to the drilling axis, which is in the axis of the chuck.

According to another advantageous characteristic, the reference surface consists of an accessory of cruciform shape composed of crossed branches mounted on a shaft perpendicular to the surface defined by the branches of the cross in the deployed position, with the shaft being secured in the drill's chuck, and with the branches bearing against the surface to be marked. This accessory that forms the reference surface is particularly practical because it has a small footprint after the refolding of the branches.

To sum up, and overall generally, the auxiliary handle according to the invention has the advantage of enabling drilling in a particularly accurate manner—generally in a direction perpendicular to the surface to be drilled and, where appropriate, in another direction chosen by the user and that, once registered, enables one to use the set position thus obtained for successive executions of a series of drillings that should have the same orientation in relation to the surface to be drilled.

DRAWINGS

The invention will described hereafter in a more-detailed manner aided by examples of implementation of auxiliary drill handles illustrated in the appended drawings, in which:

FIG. 1A is a very-simplified schematic of the display of the auxiliary handle in FIG. 1;

DESCRIPTION OF IMPLEMENTATIONS OF THE INVENTION

Figure 1:
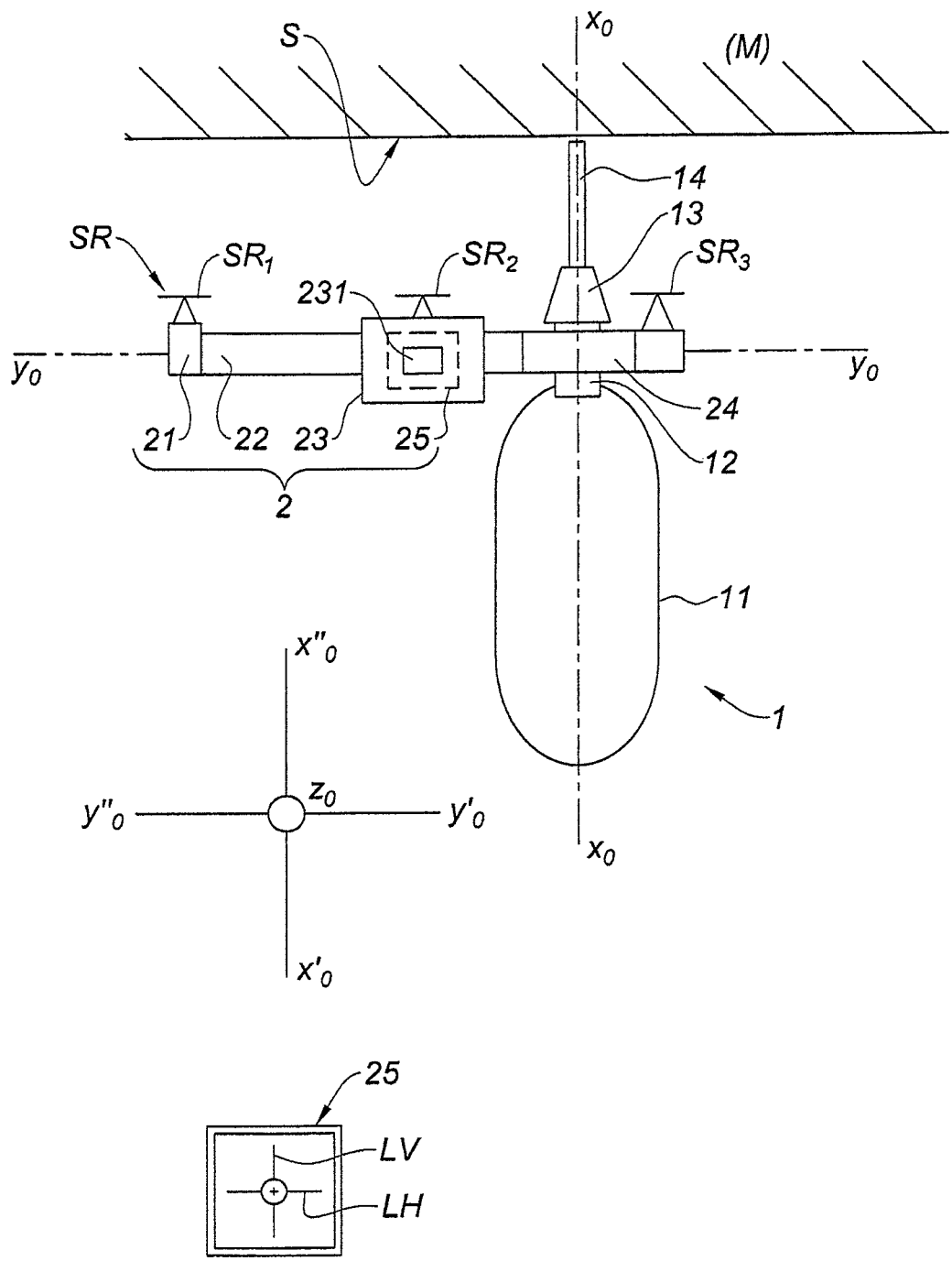
FIG. 1 is a plan-view schematic of an auxiliary drill handle mounted on a drill installed facing a medium to be drilled.

FIG. 1 is a very-schematic plan view of a hand-operated machine tool (1), such as a drill or a perforator, hereafter referred to in a simpler manner as a "drill" or "machine". This drill (1) has the function of drilling holes at an orientation established in relation to the surface (S) of a medium (M) in which the drilling(s) is/are executed.

As seen from above, the drill (1) has a body (11) accommodating the motor and the transmission mechanism, of which the output shaft bears a chuck (13) holding a tool such as the drilling bit (14). The body (11) has a cylindrical neck (12) of circular cross-section behind the chuck (13) to accommodate the auxiliary handle (2) and lock around the neck (12) in a chosen orientation.

The body (11) has—in an already-known implementation—a handle with a trigger and, where appropriate, an inverter of direction of rotation for the right hand. The other hand holds the auxiliary handle (2).

The geometric axis or drilling axis Xo of the drill (1) is that of the chuck (13) and of the drilling tool (14).

The auxiliary handle (2) is positioned in the plane of the axis Xo and of the handle of the body (11) for storage. This plane is perpendicular to the plane of FIG. 1, and passes through the axis Xo.

For working, the auxiliary handle (2) is generally locked so that its axis (Yo) is perpendicular to the plane of the axis Xo and of the handle of the body. But this orientation is not essential; it can be modified according to the user's working habits.

In all cases, the axis Yo is always perpendicular to the drilling axis Xo through the construction of the handle (2) and its positioning on the machine or on the neck (12) of the machine. The auxiliary handle (2) has a gripping part (22) terminated by an end piece in relief (21) on the exterior side, and by a casing (23) on the interior side; it continues through the split collar (24) engaged on the neck (12) and then locked onto it. The casing (23) houses an electronic tri-axial acceleration meter (231) of which the reference point XoYoZo—preferably orthogonal—is schematically illustrated in FIG. 1, together with a display (25). The electronic acceleration meter (231) incorporates calculation and storage systems for the data processing of the orientation data and its saving. Various means of control are provided, but not shown in a detailed manner, for activating the acceleration meter (on/off button) and commanding the saving/erasure of a position, or the display mode. The orthogonal reference point XoYoZo is positioned in relation to the handle (2) by the positioning of the acceleration meter (231) within the casing (23) so that:

the axis Xo of the reference point is that of the machine (1), which is also that of the collar (24);

the axis Yo of the reference point is that of the auxiliary handle (2).

By definition, the direction Zo is the direction perpendicular to the plane (Xo, Yo). Obviously, this orientation is valid regardless of the position of rotation in which the auxiliary handle (2) is locked around the neck (12), namely the machine's drilling axis Xo.

The acceleration meter automatically knows the vertical direction V and, consequently, the horizontal plane and the direction of North within the plane, such that it also knows the matrix of rotation to change from this geographical orientation (absolute orientation) to the instantaneous orientation of the handle via the reference point XoYoZo of the acceleration meter associated with the auxiliary handle.

The auxiliary handle (2) has a flat reference surface (SR) that enables marking—via contact—of the surface (S) of the medium (M) to orient/adjust the orientation of the drilling axis Xo in relation to the surface (S). The surface (S) is, by definition, flat—or it is at least locally flat at the position intended for the drilling(s).

As seen in FIG. 1, the reference surface (SR) is composed of co-planar elementary surfaces (SR1), (SR2) integral with the auxiliary handle (2) and, preferably, distributed in the direction Yo, namely co-planar surfaces containing a parallel to the axis Yo.

Figure 2:
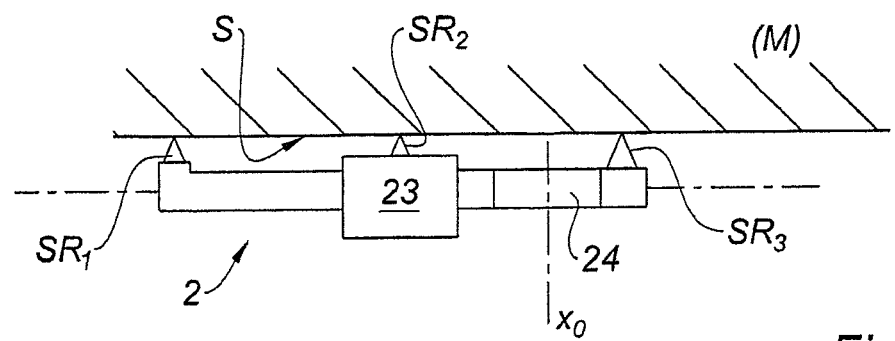
FIG. 2 is a plan view of the positioning of the auxiliary handle against the surface to be drilled, for the marking of the inclination of the surface.
Figure 3:
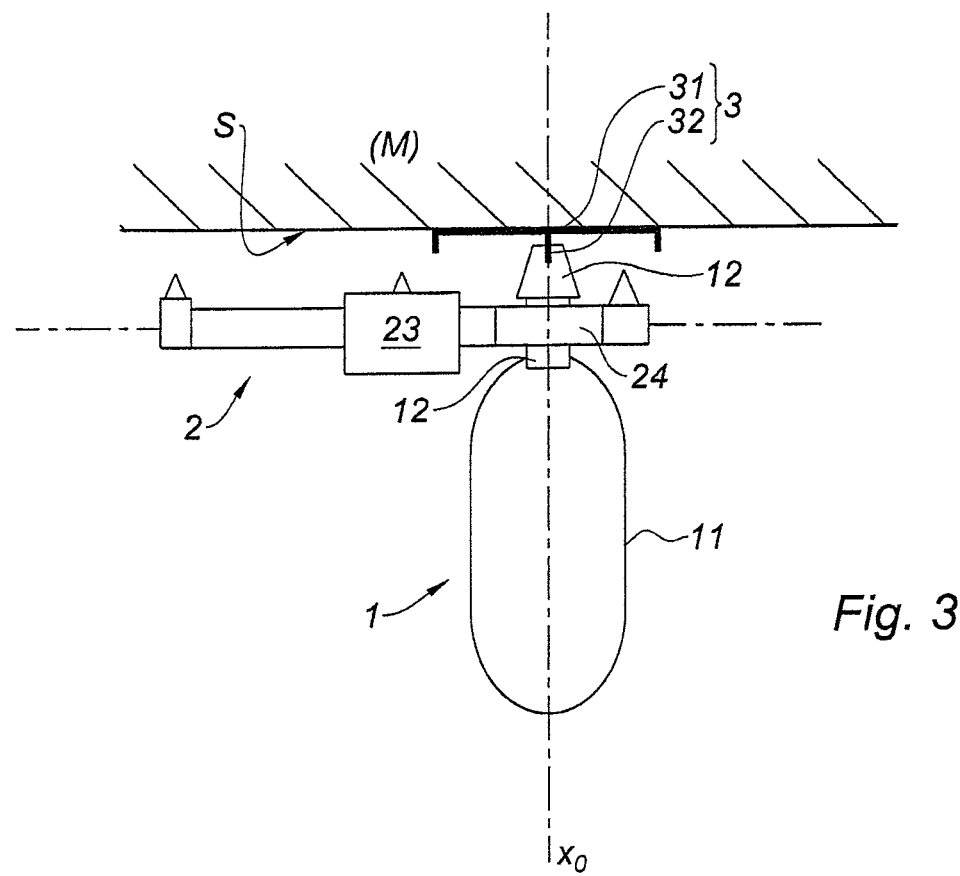
FIG. 3 is another example of marking of the inclination of the surface to be drilled, using the handle according to the invention.
Figure 4:
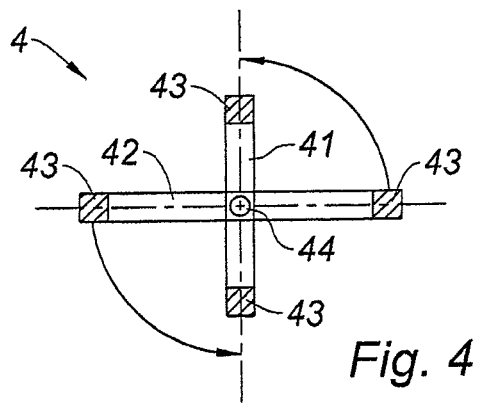
FIG. 4 is a very-simplified schematic of a reference surface according to the invention.

The elementary surfaces of (SR1), (SR2) are borne by the extremities of the handle bounding the gripping area (22), namely the exterior extremity (21) and the casing (23). There might also be, in addition to or instead of one of these elementary surfaces, an elementary surface (SR3) on the collar (24). The reference surface (SR) is used to establish the orientation of the surface (S) of the medium (M) with the handle (2), by applying this reference surface (SR) against the surface (S)—directly, as shown in FIG. 2, or by means of an accessory (3), (4) as shown in FIGS. 3 and 4. The marking of the orientation of the surface (S) will be described with reference to FIG. 5.

FIG. 1 shows the orthogonal reference point associated with the drill (1) in the horizontal plane (as a hypothesis), which is the plane in FIG. 1, with its demi-axes:

OX0', Oxo";

OYo', Oyo";

Zo.

As seen in FIG. 1A, the auxiliary handle (2) incorporates a display (25)—preferably analog, with one or two strips of illuminating points (LEDs) to aid with the orientation of the drill (1) in the right directions in relation to the surface (S) for executing the drilling.

The analog display (25) is composed of an illuminating reticle formed by two perpendicular illuminating lines (LV), (LH) that cross each other at the origin O to display the set position of the handle (2) associated with the set position of the drilling axis Xo. It is supposed that the inclination (generally vertical) of the surface (S) has been marked and saved in the acceleration meter (231), and that it is now necessary to execute drillings oriented correctly within the surface (S). It is supposed that the reference plane thus defined is the plane in FIGS. 1 and 1A. The surface S has been marked and does not necessarily have an orientation perpendicular to the plane in FIGS. 1 and 1A.

When presenting the drill (1) to execute a drilling, as per the orientation in FIG. 1A, if the auxiliary handle is inclined to the bottom right, the branch OY'o will be illuminated over a length dependent on the amplitude of the inclination; the branch ends when the inclination is zero, namely when the handle (2) is in the horizontal direction of Yo.

The same applies from the line Xo' O X0", of which the OX0' branch—is illuminated if X0 is inclined towards the bottom, machine side.

These means of analog display of the set position are only conventional examples; one can, for example, illuminate the other branch of each line or invert the concepts of inclination upwards/downwards. All these analog display systems show the correct position by complete extinction of their illumination, or by only leaving the illumination of the origin O in another color—green, for instance—whereas the branches are illuminated in red or orange when they are inclined.

FIG. 2 shows the auxiliary handle (2) alone, applied via its elementary reference surfaces (SR1), (SR2), (SR3) against the surface (S) to mark its orientation. For this, one dismounts the handle (2) by loosening the collar (24). After the marking, the handle (2) is remounted. This operation is very quick because one only has to loosen and then tighten the collar securing nut.

This marking is performed by the acceleration meter, which automatically corrects the handle's set position, namely performs the marking of the orientation of the surface (S) in relation to the acceleration meter's horizontal plane, regardless of the actual orientation of the handle during this marking. The user saves the position of the surface (S) by pressing a button that is not illustrated.

According to one variant (FIG. 3), the reference surface (SR) is an accessory (3) composed of a flat plate (31)—a disc, for example—endowed with a shaft (32) perpendicular to the surface of the plate (31). This shaft (32) is fitted into the chuck (12), like the stem of a drill bit, and is secured there to support the plate, mounted on the machine (1), with its auxiliary handle (2) against the surface (S) to mark the orientation.

This accessory (3) avoids having to dismount the handle (2) to apply it against the surface (S) and then remount it on the drill.

When the reference surface (SR) is applied against the surface (S) to be drilled, the position is registered in the acceleration meter, which will be used as reference position.

FIG. 4 shows another example accessory (4) forming a reference surface (SR). The accessory (4) is a cruciform shape with two branches (41), (42) pivoting between a folded position and a position of deployment in cruciform shape. The extremities define a plane via studs (43). The cruciform shape (4) is endowed with a shaft (44) perpendicular to the plane of the deployed cruciform shape (4). This reference surface is used like the one illustrated in FIG. 3.

Figure 5:
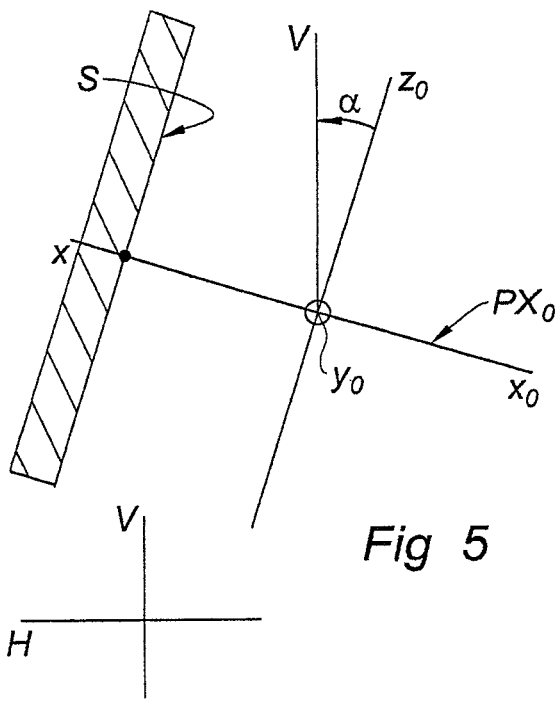
FIG. 5 is a geometric schematic that explains the principle of orientation of the drill fitted with the auxiliary handle according to the invention.

The acquisition of the orientation of the flat surface (S) is described with the aid of FIG. 5, which shows the plane (line S) which, for simplification, is perpendicular to the surface of the plane in FIG. 5, in which the vertical direction V and the horizontal direction H have been indicated.

The auxiliary handle (2) with the built-in acceleration meter (231) and the reference surface (SR), or the handle (2) only, are applied by the reference flat surface (SR) against the surface (S) (the items are not illustrated in FIG. 5).

The drilling axis Xo is contained within the plane in the illustration, which results automatically from the simple positioning of the reference surface (SR) against the surface (S) of the wall. However, the same does not apply for the axis Zo. To position it within the plane in FIG. 5, which is also the vertical plane, one pivots the auxiliary handle (2) around the axis Xo until it is horizontal (this direction is perpendicular to the plane in FIG. 5). This is one of the manners of using the acceleration meter to detect the inclination of the surface (S). However, as already explained above, the fact of producing the reference surface (SR)— which is perpendicular to the axis Xo of the drill (1)—the only undetermined variable is the orientation of the handle (2) at the moment of the registration: one of the solutions consists in placing the handle in the horizontal position; the other, simpler solution is to use the horizontal orientation internally within the acceleration meter, without taking account of the orientation of the handle (2) for the marking. This will give the position of the surface (S) and of the handle in relation to this marked position. Then, to use the drill and its positioning in relation to the surface (S) to be drilled, the acceleration meter will impose—via its display (25)—the set position of the axis Xo of the drill (1) through the set position to be attributed to the handle (2) (its axis Yo).

In the example presented, the axis Zo forms an angle ($\alpha$) in relation to the vertical (V). This angle is the inclination of the surface (S). It is zero with a vertical surface (S). This marking measurement is performed to execute a drilling perpendicular to the surface (S) in the direction of drilling Xo—which is inclined here in relation to the vertical (V)— can also be used to execute a drilling that is non-perpendicular to the surface (S), which can also not be vertical but inclined.

If the drilling angle is other than 90°, one simply enters the changed angle into the acceleration meter to take account of it automatically. The registration of the inclination of the surface (S) is still performed as described above. The marking processes described above provide precise orientations of the drilling axis for precise, imposed examples.

But it is also possible to register an appropriate angle specified by the operator. This presents the drill equipped with the drill bit in accordance with the desired orientation against the surface to be drilled. It commands the saving of this part of the acceleration meter, and then uses this orientation for four other drillings of a series of drillings.

After having thus marked the angle of the surface (S) and having saved it in the acceleration meter, it is easy to position the drilling access Xo in accordance with the desired angle (direction perpendicular to the surface (S) or in accordance with a certain inclination, with simple reference to the readings of the display (25) for calculating the orientation errors of the lines (LV), (LH) and display the correct general orientation via the extinction of lines and the possible illumination of the origin of the display reticle.

To explain the principle employed by the acceleration meter and the display without requiring a particular level to obtain the horizontal direction of the auxiliary handle (2), the various angular relationships are described below.

Firstly, it is simple to explain how to orient the auxiliary handle (2) horizontally, using the diagram in FIG. 5.

For the needs of the explanation, one can assume that, working from the position to be obtained, namely the position of the machine (1) when oriented correctly, to drill:

the drilling axis Xo is perpendicular to the surface (S) to be drilled (this is the general case);

the axis Yo of the auxiliary handle (2) is perpendicular to the plane in FIG. 5 and, therefore, the axis Zo is within the plane of this illustration.

This also means, geometrically, that the plane perpendicular to Zo containing the axis Xo cuts through the surface (S) in a line that is horizontal because the said line is perpendicular to the plane in FIG. 5, which is vertical by hypothesis.

If, for whatever reason, the drill (1) moves and if, in a simple example, it conserves the orientation of the axis Zo in relation to the vertical, namely that the line of drilling Xo remains within the perpendicular plane PXo in FIG. 5, but is inclined in relation to the surface (S) then the axis Yo of the auxiliary handle (2) remains within the plane PXo perpendicular to the fixed axis Zo. But it will no longer be perpendicular to the plane in the illustration and, therefore, the axis Yo, namely the auxiliary handle (2) will no longer be horizontal; this is of no importance in itself for the auxiliary handle (2), but it means that the drilling axis Xo is no longer perpendicular to the surface (S). In other words, if the handle (2) is no longer horizontal, the drilling axis Xo will no longer be perpendicular to the surface (S).

Working from the result to be obtained (the orientation of the axis Xo in relation to the surface (S), this analysis shows that the marking registered within the acceleration meter, namely the angle ($\alpha$) and the horizontal direction imposed on the axis Yo of the handle (2) are sufficient to correctly orient the drill (1) for drilling.

To sum up, the acceleration meter enables one to adjust the drilling axis Xo in relation to the surface (S) by observing its display (25) while doing drilling work and/or for executing successive drillings with the same orientation in relation to the surface (S).

A similar "*mutans* mutandis" explanation also applies to a change of inclination of the axis Zo that moves outside the plane in FIG. 5.

The various explanations provided above apply to any other orientation to be given to the drilling axis Xo, with this being achieved by a simple change of orientation of the angle of the surface (S) to be drilled, and for drilling axis Xo that are not only inclined in a plane (V, H) perpendicular to the surface (S) but also for whatever inclination of the drilling axis Xo.

Figure 5A:
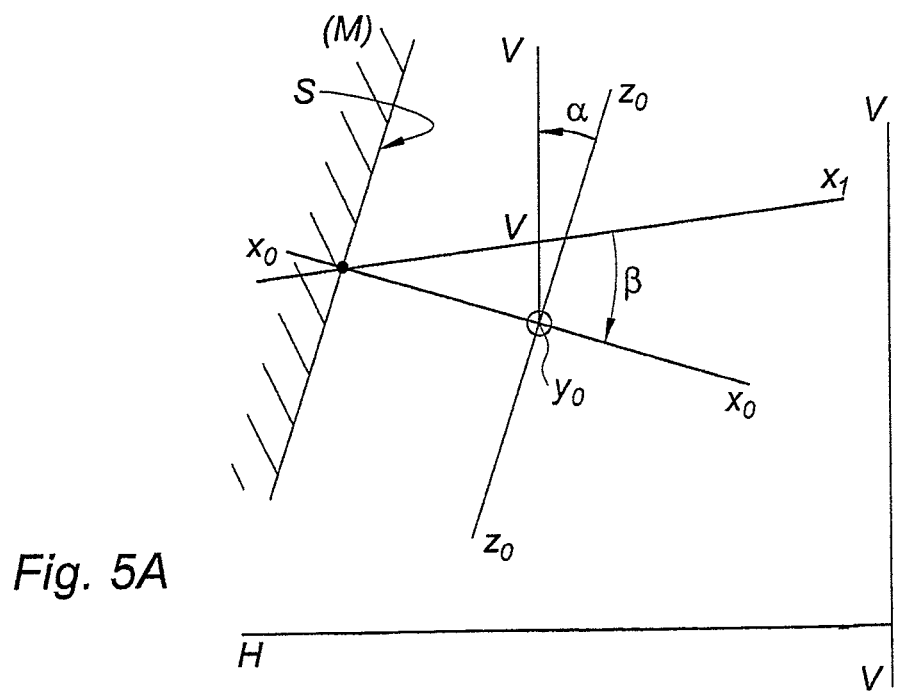
FIG. 5A is a schematic similar to that of FIG. 5, for an operation of marking/drilling of the surface to be drilled.

Thus, FIG. 5A shows how to drill a hole of direction $X_1$ forming a precise angle ($\beta$) in relation to the perpendicular Xo to the surface (S), after having marked and saved the inclination of the surface (S). One simply enters the value ($\beta$) into the acceleration meter (231) for it to take it into account and specify this direction $X_1$ in relation to the horizontal plane, with the perpendicularity of Xo in relation to the plane being obtained at the moment of the marking, working from the inclination of the reference point XoYoZo in relation to the vertical direction, with the axis Yo being horizontal.

Figure 6A:
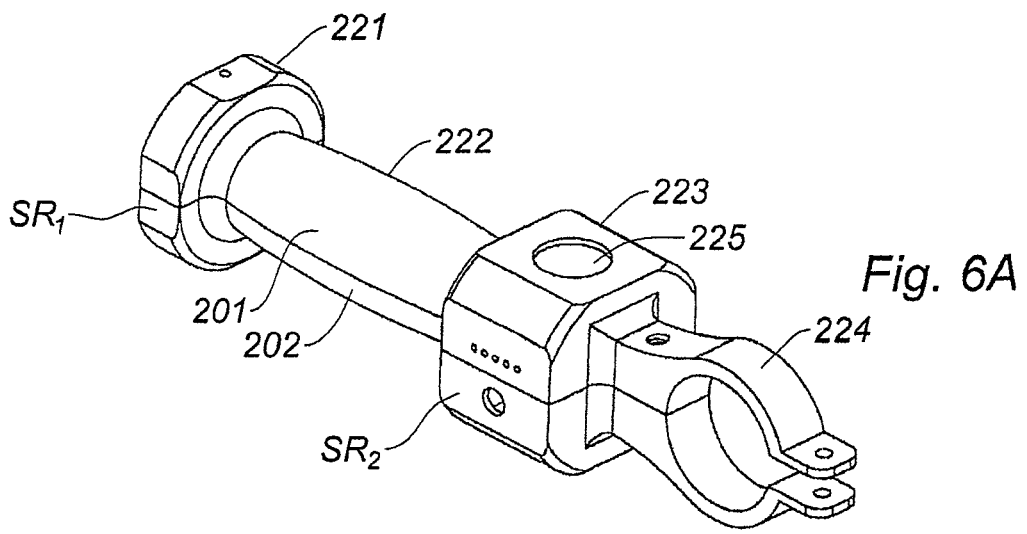
FIGS. 6A, 6B are in-perspective views in two different directions of the shell of the auxiliary handle.
Figure 6B:
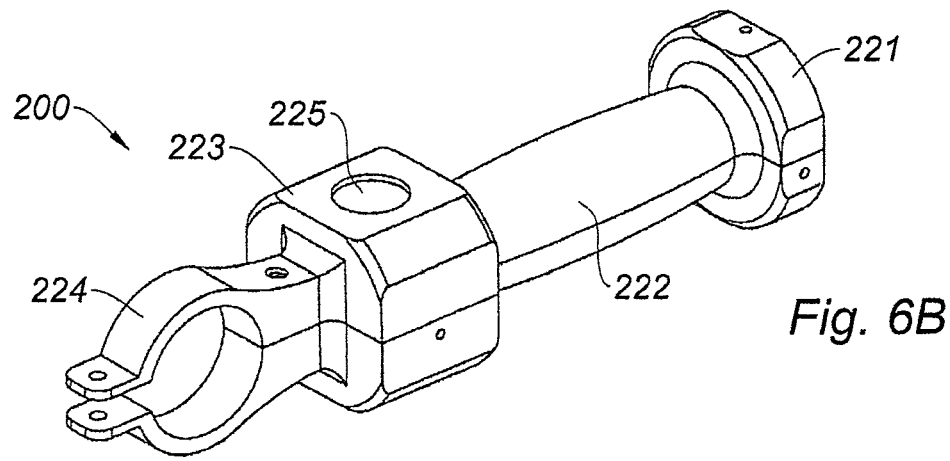

FIGS. 6A and 6B show an in-perspective view, in two different directions, of an auxiliary handle (200) according to the invention, composed of a shell with two constituent parts (201), (202) cutting across the "horizontal" plane of symmetry. The handle (200) has one end in relief (221), a gripping part (222), and a casing (223) followed by a split collar (224) that fits around the cylindrical neck (12) of the drill's (1) body (11).

The elementary surfaces (SR1), (SR2) have facets forward of the extremity in relief (221) and the casing (223). The casing (223) incorporates a display (225).

The actuating instrumentation such as the on/off button or the button for registering the surface (S) are not illustrated.

Figure 7:
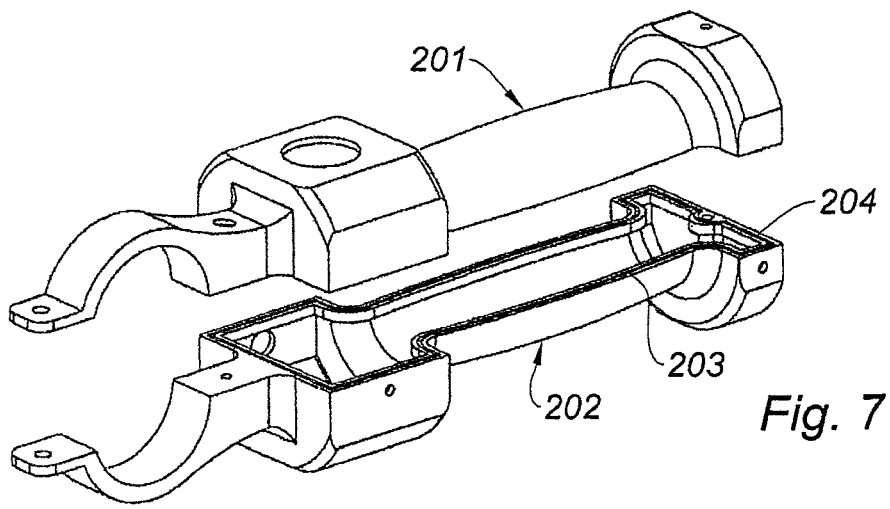
FIG. 7 is an exploded view of the shell of the auxiliary handle.

FIG. 7 shows the two semi-shells (201), (202) separated at the plane of joining and the seal (203) engaged in a peripheral groove (204) to ensure the impermeability of the shell's interior. As explained above, the shell accommodates the various functional parts of the handle—notably the acceleration meter, the power supply battery and, where applicable, the remote sensing or orientation LEDs emitting a directional beam through apertures (not referenced) in the casing and in the extremity in relief (223), (221).

LIST OF PRINCIPAL PARTS

1 Drill
11 Body
12 Cylindrical neck
13 Chuck
14 Drilling tool/bit
2 Auxiliary handle
21 Extremity in relief
22 Gripping part
23 Casings
200 Auxiliary handle
201 Shell component
202 Shell component
203 Seal
204 Peripheral groove
221 Extremity in relief
222 Gripping part
223 Casing
224 Collar
231 Acceleration meter
24 Collar
25 Display
3 Accessory
31 Flat plate
32 Shaft
4 Accessory/cruciform part
41 Branch
42 Branch
43 Shaft
LH Horizontal line
LV Vertical line
M Medium/wall
S Surface to be drilled
SR Reference surface
SR1, SR2, SR3 Elementary reference surfaces

The invention claimed is:

1. An auxiliary handle designed to be installed on the body (11) of a drill (1) having a drilling axis (Xo); the auxiliary handle (2) characterized in that it incorporates an electronic acceleration meter (231), with axes (XoYoZo) defining an orthogonal reference point, wherein one (Xo) of the axes being the drilling axis, the other axis (Yo) being that of the handle (2), and one associated reference surface (SR,SR1-SR3) is formed by the elementary surfaces (SR1-SR3) from a shell of the auxiliary handle (2) to a reference point of the acceleration meter (231) to register a relative position between a surface to be drilled (S) and the drill (1) and to calculate a set position of the drilling axis (Xo), and wherein reference surface (SR) is composed of co-planar elementary surfaces (SR1), (SR2) integral with the auxiliary handle (2) and distributed in the direction (Yo), and a display (25) to show a set position of the handle (2) calculated from the set position of the drilling axis (Xo) to execute the drilling.

2. The auxiliary handle in accordance with claim 1, characterized in that it incorporates a collar (24) to be installed on a cylindrical neck (12) of the drill (1).

3. The auxiliary handle in accordance with claim 1, characterized in that it has a gripping part (22) terminated by an end piece in relief (21) on an exterior side and by a casing (23) on an interior side.

4. The auxiliary handle in accordance with claim 3, characterized in that the orthogonal reference point (XoYoZo) is positioned in relation to the handle (2) by the positioning of the acceleration meter (231) within the casing (23).

5. The auxiliary handle in accordance with claim 4, characterized in that the axis (Xo) of the orthogonal reference point is also that of the collar (24).

6. The auxiliary handle in accordance with claim 3, characterized in that the exterior extremity (21) and the casing (23), form co-planar elementary surfaces (SR1, SR2) distributed in the direction (Yo).

\* \* \* \* \*